United States Patent [19]

Kisovec

[11] 4,215,587
[45] Aug. 5, 1980

[54] FOLDING MECHANISM
[75] Inventor: Adrian V. Kisovec, Wallingford, Pa.
[73] Assignee: The Boeing Company, Seattle, Wash.
[21] Appl. No.: 821,069
[22] Filed: Aug. 2, 1977
[51] Int. Cl.² ........................................... F16H 25/08
[52] U.S. Cl. .................................. 74/22 R; 74/89.14; 244/120; 292/36; 49/280
[58] Field of Search ..................... 74/89.14, 22 R; 244/120, 17.11; 292/35, 36, 142, 160, 172; 49/279, 280, 281

[56] References Cited

U.S. PATENT DOCUMENTS

| | | | |
|---|---|---|---|
| 222,136 | 12/1879 | Hutton | 49/279 |
| 1,166,061 | 12/1915 | Lehberger | 244/120 |
| 2,649,301 | 8/1953 | Signore | 49/279 |
| 2,759,227 | 8/1956 | Reid | 292/172 |
| 2,999,683 | 9/1961 | Pickles | 49/280 |
| 3,479,767 | 11/1969 | Gardner | 49/280 |
| 3,869,185 | 3/1975 | Ciciulla | 292/35 |
| 3,991,595 | 11/1976 | Bahry | 292/142 |

FOREIGN PATENT DOCUMENTS

| | | | |
|---|---|---|---|
| 80362 | 7/1894 | Fed. Rep. of Germany | 49/279 |
| 1246569 | 10/1960 | France | 292/35 |
| 121371 | 4/1946 | Sweden | 292/36 |

Primary Examiner—Samuel Scott
Assistant Examiner—G. A. Anderson
Attorney, Agent, or Firm—Felix J. D'Ambrosio; Edwin E. Greigg; Jack D. Puffer

[57] ABSTRACT

What follows is a description of a mechanism for displacing structurally related component parts of a larger assembly of parts relative to each other. The component parts are typically locked together into the larger assembly and the mechanism is designed to first unlock the component parts and thereafter produce the relative displacement of the component parts. The mechanism is also designed to reverse the noted procedure and first produce the relative displacement followed by locking of the component parts. The procedure is effected using a single actuator and a continuous operation.

12 Claims, 5 Drawing Figures

FOLDING MECHANISM

BACKGROUND OF THE INVENTION a. Field of the Invention

This invention relates to a mechanism for displacing structurally related component parts of a larger assembly of parts. The component parts are hinged together so that the displacement produced by the mechanism is pivotal. In the art, this type of displacement is referred to as "folding" of the component parts.

In particular, the component parts are major parts of an aircraft, such as the fuselage, wings or rotor blades (in the case of helicopters). In fact the invention was developed for use in folding the fuselage of a helicopter and the preferred embodiment described below is directed specifically to helicopters.

b. General Discussion and consideration of the Prior Art

The problem of storage capacity for both military and commercial aircraft of all types is well known. Generally, aircraft designers have solved this problem by providing the aircraft with the capability of relative displacement (folding) of certain of its parts; for example, the relative displacement of wings, fuselages and rotor blades. The following list of U.S. patents are exemplary of some of the solutions which exist in the prior art: U.S. Pat. Nos. 2,823,554; 3,043,410; 3,133,715; 3,153,521; and 3,750,982. All of these patents disclose a mechanism of one form or another which is utilized to effect the desired folding of the aircraft component.

It is the mechanism for effecting the desired folding which is the starting point of this invention. I have found all of the mechanisms with which I am familiar to be inadequate because they either require manual unlocking or an actuator for unlocking the mechanism first and an additional actuator for producing the folding or relative displacement thereafter. The Pearson U.S. Pat. No. 3,043,410 is a good example of a mechanism requiring an actuator to first unlock the mechanism. See in particular column 3, lines 15–42.

It would be desirable, therefore, to have a mechanism for folding major aircraft components which does not require manual or the use of separate actuators to first unlock the component parts and thereafter fold the component parts. It would also be desirable to have a mechanism for folding major aircraft components which is automatic in the sense that the locking and unlocking and folding is achieved in a continuous operation.

OBJECTS AND SUMMARY OF THE INVENTION

A general object of the invention is to fulfill the need expressed above.

It is a specific object of the invention to provide the existing state-of-the-art with a folding mechanism which employs a single actuator and a continuous operation to either open or close two hinged component parts of a larger assembly of parts. The single actuator configuration permits the unlocking and opening of as well as the locking and closing of the hinged component parts.

It is a more specific object of the invention to provide the existing state-of-the-aircraft-art, and in particular the helicopter art, with the noted folding mechanism for use primarily in folding component parts of a fuselage.

The objects are achieved by the invention in a manner which I believe to be novel and advantageous. It is novel in its utilization of a single actuator to effect the whole procedure of locking, unlocking and folding of the component parts; and in its specific combination of elements including the actuator. It is advantageous in that all folding functions are automatically sequenced by means of a single actuator; and in that it can be actuated manually, with an external power tool, from the cockpit of the aircraft or from a remote location without requiring modification.

DESCRIPTION OF THE PREFERRED EMBODIMENT

Figure 1:
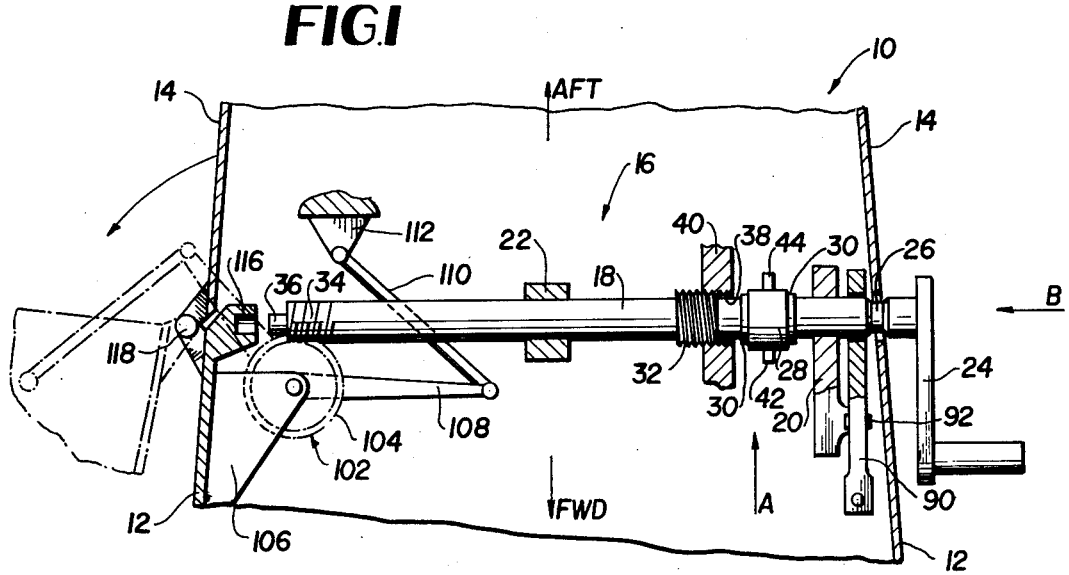
FIG. 1 is a top plan view of the folding mechanism.

Turning to FIG. 1, there is illustrated a fuselage or airframe 10 having component parts 12 and 14 which are displaced (folded) relative to each other by a folding mechanism 16. Supported on the component part 12 for rotation is an axle 18. In particular the axle 18 is supported between lugs 20 and 22, and is displaceable axially, in the direction of its longitudinal axis relative to the lugs 20 and 22, i.e., the axle 18 slides relative to the lugs 20 and 22. Both the lugs 20 and 22 are attached to the component part 12.

The axle 18 includes along its length a splined end (not shown) which is engaged by a power input source 24 (shown in the exemplary embodiment as a hand crank 24); an annular groove 26; a collar 28 situated between shoulders 30; a threaded portion 32, a worm gear 34; and a pin end 36. The threads of the threaded portion 32 engage with the threads 38 formed in the bore of a lug 40. The lug 40 is also attached to the component part 12. The collar 28 is situated between shoulders 30 so that the axial movement of the axle 18 can be transmitted to the collar 28, while permitting free relative rotation of the axle 18 with respect to the collar 28.

Figure 2:
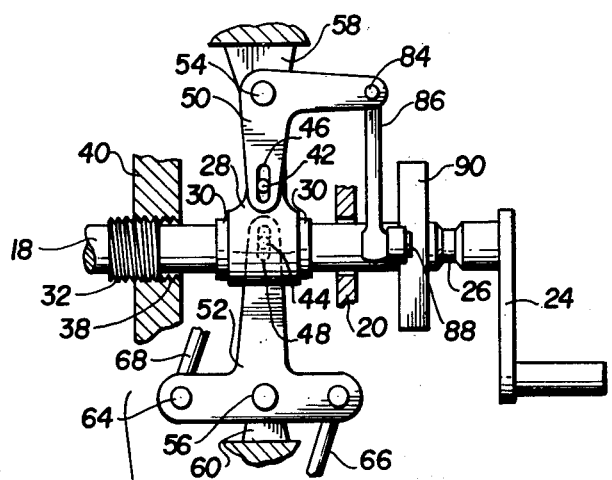
FIG. 2 is a detail view in elevation of the linkage assciated with the collar 28 of FIG. 1.

The elements operatively associated with the collar 28 are best seen in FIG. 2. The elements in FIG. 2 are viewed in the direction of the arrow A of FIG. 1 (aft direction). In this regard, the crank 24 has been rotated 90° from its position shown in FIG. 1. The collar 28 includes two pins 42 and 44 which extend forward and aft, respectively, from the collar 28. These pins engage the surfaces of slots 46 and 48, respectively, of levers 50 and 52. The levers 50 and 52 are in turn pivotably mounted by pins 54 and 56 to mounting lugs 58 and 60, respectively. The lugs 58 and 60 are also attached to the component part 12. The lever 52 is T-shaped and is connected by pins 62 and 64 to links 66 and 68. The opposite end of the links 66 and 68 are connected to similar locking assemblies 70, one above and the other below the axle 18. Only the locking assembly below the axle 18 is shown for ease of illustration. Each locking assembly 70 includes a locking pin 72 pivotably connected to the link 66 by a pin 74, and engaging lugs 76 and 78. The lug 78 is configured as a clevis which defines a slot 80 into which the lug 76 is received. The lug 76 is attached to the component part 12 and the lug 78 is attached to the component part 14. When the two component parts are engaged, the lugs 76 and 78 are also in register, as shown in FIG. 2 with the locking pin 72 received within aligned slot 82 for locking the lugs 76 and 78 and consequently the component parts 12 and 14 together.

Figure 3:
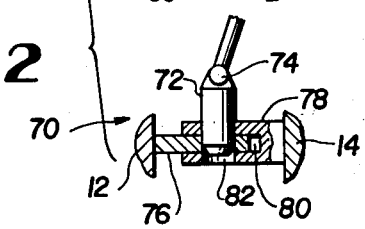
FIG. 3 is a side view of the linkage associated with the cam of FIGS. 1 and 2.
Figure 4:
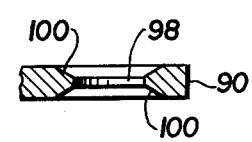
FIG. 4 is a sectional view taken along 4—4 of FIG. 3.

The lever 50 is connected by a pin 84 to a link 86. The link 86 is connected by a pin 88 to a cam lever 90, and the cam lever 90 is in turn pivotably mounted by a pin 92 to a lug 94, which is also attached to the component part 12. The cam lever 90 has an arcuate slot 96 defined therein (FIG. 3). This slot narrows to a portion 98. In cross section the narrowed portion 98 can be seen to include bevel edges 100 (FIG. 4). These edges engage similar edges on the axle 18 leading into the annular groove 26. The matching edges are provided in order to insure a smooth and effective reception of the slot portion 98 into the annular groove 26 in order to terminate the axial movement of the axle 18.

The members introduced above, beginning with the axle 18 and excluding the power source 24 and the locking assemblies 70, form elements of an actuator which controls placement of the locking pins 72 and actuation of a transmission mechanism 102.

The transmission 102 includes a gear 104 mounted by a bracket 106 to the component part 12, an arm 108 connected to the gear 104, a link 110 connected to arm 108 and to a mounting lug 112, which is attached to the component part 14, and a recess 116. Finally, the component parts 12 and 14 are connected together at hinge 118 for the relative displacement or folding noted above.

Figure 5:
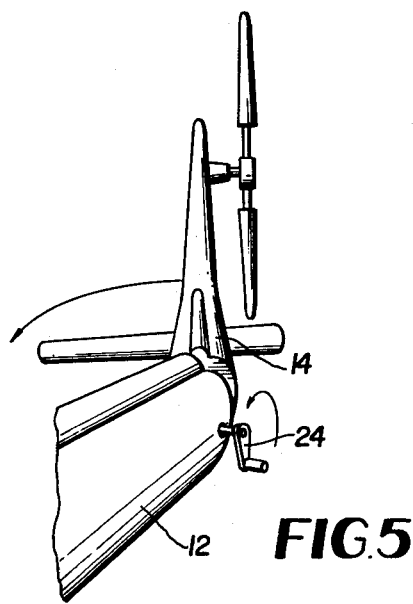
FIG. 5 illustrates two component parts of the fuselage which are folded using a manual crank.

The folding mechanism 16 produces the desired displacement of the component parts 12 and 14 in the following manner:

The splined end of the axle 18 is engaged by the power source 24, which can be a manually operable crank lever, or an equivalent power tool, or even a remotely controlled servo-motor. Either of these devices produces rotation of the axle 18 relative to its support lugs 20 and 22 and the collar 28. Because of the engagement of the threads 32 with the threads 38 in the bore of the lug 40 and disengagement of the annular groove 26 and the narrowed portion 98, the axle 18 advances axially in the direction of arrow B (FIG. 1). During this initial axial displacement of the axle 18, the worm gear, or drive means 34 is not yet in engagement with the gear 104, instead the levers 50 and 52 are pivoted about their pivot pins 54 and 56 by their engagement with the collar 28. The pivotal motion of the lever 52 causes each locking pin 72 to be withdrawn from its associated aligned slot 82 so that the lugs 76 can move out of the slot 80. At the same time, the pivotal motion of the lever 59 moves the link 86 down (FIG. 2) which in turn causes the cam link 90 to pivot about its pin 92 so that the annular groove 26 engages the narrowed portion 98 of the arcuate slot 96. The elements are dimensional so that the annular groove 26 engages the narrowed portion 98 when the locking pins 72 are withdrawn from the aligned slots 82, and when the pin end 36 is received within the recess 116. In this condition, axial displacement of the axle 18 is terminated and the continued rotation of axle 18 produces, through the worm gear 34, rotation of the gear 104. Of course, it should also be noted that at this time, the threaded portion 32 is no longer in engagement with the threads 38. Rotation of the gear 104 produces the displacement or folding of the component part 14 relative to the component part 12 about the hinge 118 shown in FIG. 5 and in dashed lines in FIG. 1.

To engage the component parts 12 and 14 and secure the locking thereof, it is only necessary to reverse the procedure outlined above by reversing the power input (torque input) from the power source 24.

From the above, it can be seen that a single individual can effect folding of the component parts 12 and 14 using a signal actuator powered by a hand crank, or power tool or remotely controlled servo-motor to unlock the component parts and then fold them in a continuous operation.

Although the foregoing description and drawings suggest the use of this folding mechanism in a helicopter, it will be appreciated that it is compatible with other types of aircraft, and even with other types of structures that are massive and require folding.

Further it will be appreciated that other major assemblies of aircraft in addition to the fuselage, such as wing sections, empennage surfaces, etc. can be expeditiously folded with this folding mechanism.

Although the specific elements such as levers, links, cams, gears, and the like, have been specified in the preferred embodiment, other mechanisms which provide equivalent types of motion, support, etc. are contemplated as part of this invention.

What is claimed is:
1. A mechanism for displacing hinged component parts of a structure relative to each other, comprising in combination:
   (a) a transmission connected to both component parts, for transmitting upon actuation by an actuator, movement of the actuator to one of the component parts, thereby pivoting said component part relative to the other component part;
   (b) at least one locking assembly connected to both component parts, for retaining the component parts against relative pivotal movement; and
   (c) an actuator connected to one of the component parts and to each locking assembly, said actuator being mounted for translation and rotation and configured so that the rotation produces the translation which effects engagement of the actuator with the transmission, for effecting through the movement thereof and in a continuous operation, actuation of the transmission for pivoting said component part relative to the other component part and locking and unlocking of the locking assemblies.

2. The mechanism as defined in claim 1, wherein the transmission includes a gear engageable by the actuator and linkage means connected to the gear and to the other component, and wherein rotation of said gear is transmitted by the linkage means into the relative pivoting of the component parts.

3. The mechanism as defined in claim 1, wherein each locking assembly includes a locking pin on a pair of engageable lugs connected to respective ones of the component parts and defining an alignment bore for reception of the locking pin, and wherein the locking pin is displaceable by the actuator into and out of engagement with the alignment bore.

4. A mechanism for displacing hinged component parts of a structure relative to each other, comprising in combination:

(a) a transmission connected to both component parts, for transmitting upon actuation by an actuator, movement of the actuator to one of the component parts, thereby pivoting said component part relative to the other component part;

(b) at least one locking assembly connected to both component parts, for retaining the component parts against relative pivotal movement; and (c) an actuator connected to one of the component parts and to each locking assembly, and engageable with the transmission, said actuator including: an elongated axle being mounted for axial displacement in the direction of its longitudinal axis and rotation about its longitudinal axis; means mounted partly on said axle for effecting said axial displacement, during rotation, and as a result thereof, locking and unlocking of the locking assemblies; and drive means for engagement with the transmission, for effecting actuation of the transmission and pivoting of said component part relative to the other component part, said locking, unlocking and actuation being effected in a continuous operation.

5. The mechanism as defined in claim 4, wherein the transmission includes a gear engageable by the actuator and linkage means connected to the gear and to the other component, and wherein rotation of said gear is transmitted by the linkage means into the relative pivoting of the component parts.

6. The mechanism as defined in claim 4, wherein each locking assembly includes a locking pin and a pair of engageable lugs connected to respective ones of the component parts and defining an alignment bore for reception of the locking pin, and wherein the locking pin is displaceable by the actuator into and out of engagement with the alignment bore.

7. The mechanism as defined in claim 4, wherein the actuator further includes: a threaded portion forming part of said means mounted partly on said axle; a worm gear forming said drive means; an annular groove formed in the axle; a collar mounted on the axle; means connecting the collar to the locking assemblies; further means connecting the collar to stop means; and thread defining means forming the remainder of said means mounted partly on said axle.

8. The mechanism as defined in claim 7, wherein the means connecting the collar to the locking assemblies includes: a pivotably mounted lever connected to the collar; and a link for each locking assembly connected to the lever and the locking assembly.

9. A mechanism for displacing hinged component parts of a structure relative to each other, comprising in combination:

(a) a transmission connected to both component parts, for transmitting upon actuation by an actuator, movement of the actuator to one of the component parts, thereby pivoting said component part relative to the other component part;

(b) at least one locking assembly connected to both component parts, for retaining the component parts against relative pivotal movement; and (c) an actuator connected to one of the component parts and to each locking assembly, and engageable with the transmission, for effecting through the movement thereof and in a continuous operation, actuation of the transmission for pivoting said component part relative to the other component part and locking and unlocking of the locking assemblies, said actuator including: an elongated axle having spaced along its length a threaded portion, a worm gear, an annular groove and a collar; means connecting the collar to the locking assemblies; further means connecting the collar to stop means; and thread defining means, wherein the axle is supported for axial displacement in the direction of its longitudinal axis and rotation about its longitudinal axis, with the axial displacement of the axle being effected by engagement, during rotation, of the threaded portion with the thread defining means, thereby producing the locking and unlocking of each locking assembly, and with the rotation of the axle through the means connecting the collar of the locking assemblies, thereby producing through the engagement of the worm gear and the transmission gear and the stop means with the annular groove the pivoting of the component parts relative to each other.

10. The mechanism as defined in claim 9, wherein the means connecting the collar to the locking assemblies includes: a pivotably mounted lever connected to the collar; and a link for each locking assembly connected to the lever and the locking assembly.

11. The mechanism as defined in claim 9, wherein the stop means comprises a cam lever defining an arcuate slot having a narrowed portion at one end thereof, said cam lever being pivotably mounted for movement substantially perpendicular to the longitudinal axis of the axle and for the passage of the axle through said arcuate slot, wherein the further means includes: a pivotably mounted lever connected to the collar; and a link connected to the lever and to the cam lever, and wherein the engagement of the annular groove with said narrowed portion of the slot terminates axial displacement of the axle.

12. A mechanism for displacing hinged component parts of a structure relative to each other, comprising in combination:

(a) a transmission connected to both component parts, for transmitting upon actuation by an actuator, movement of the actuator to one of the component parts, thereby pivoting said component part relative to the other component part;

(b) at least one locking assembly connected to both component parts, for retaining the component parts against relative pivotal movement; and (c) an actuator connected to one of the component parts and to each locking assembly, and engageable with the transmission, said actuator including: an elongated axle being mounted for axial displacement in the direction of its longitudinal axis and rotation about its longitudinal axis; means mounted partly on said axle for effecting said axial displacement, during rotation, and as a result thereof, locking and unlocking of the locking assemblies; a threaded portion forming part of said means mounted partly on said axle; a worm gear forming drive means for engagement with the transmission, for effecting actuation of the transmission and pivoting of said component part relative to the other component part, an annular groove formed in the axle; a collar mounted on the axle; means connecting the collar to the locking assemblies; a pivotably mounted lever connected to the collar; a cam lever defining an arcuate slot having a narrowed portion at one end thereof, said cam lever being pivotably mounted for movement substantially perpendicular to the longitudinal axis of the axle and for the passage of the axle through said arcuate slot; a link connected to the pivotably mounted lever and to the cam lever; and thread defining means forming the remainder of said means mounted partly on said axle, wherein the engagement of the annular groove with said narrowed portion of the slot terminates axial displacement of the axle, and wherein said locking, unlocking and actuation is effected in a continuous operation.

* * * * *